US008793535B2

(12) United States Patent
Salloum et al.

(10) Patent No.: US 8,793,535 B2
(45) Date of Patent: Jul. 29, 2014

(54) OPTIMIZING SYSTEM USAGE WHEN RUNNING QUALITY TESTS IN A VIRTUAL MACHINE ENVIRONMENT

(75) Inventors: Ghassan Salloum, Seattle, WA (US);
Deepak Kumar, Kirkland, WA (US);
Gaurav Bhandari, Redmond, WA (US);
Brian Anger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 13/188,454

(22) Filed: Jul. 21, 2011

(65) Prior Publication Data

US 2013/0024729 A1   Jan. 24, 2013

(51) Int. Cl.
*G06F 11/00* (2006.01)

(52) U.S. Cl.
USPC .............................................. 714/32; 714/33

(58) Field of Classification Search
USPC ............. 714/25, 28, 32, 33, 37, 38.14; 713/1
See application file for complete search history.

(56) References Cited

U.S. PATENT DOCUMENTS

| | | | |
|---|---|---|---|
| 7,047,176 B2 * | 5/2006 | Klevans et al. | 703/21 |
| 7,093,086 B1 | 8/2006 | Van Rietschote | |
| 7,366,955 B2 * | 4/2008 | Kuturianu et al. | 714/38.14 |
| 7,925,692 B2 * | 4/2011 | Dunagan | 709/203 |
| 8,301,935 B2 * | 10/2012 | Martinov | 714/25 |
| 2004/0255194 A1 * | 12/2004 | Genkin et al. | 714/28 |
| 2005/0039079 A1 * | 2/2005 | Higashi et al. | 714/28 |
| 2006/0074618 A1 | 4/2006 | Miller et al. | |
| 2008/0244577 A1 | 10/2008 | Le et al. | |
| 2009/0100418 A1 | 4/2009 | Raman et al. | |
| 2009/0307763 A1 * | 12/2009 | Rawlins et al. | 726/5 |
| 2009/0320014 A1 | 12/2009 | Sudhakar | |
| 2010/0138831 A1 | 6/2010 | Inoue et al. | |
| 2010/0251099 A1 * | 9/2010 | Makower et al. | 715/237 |
| 2011/0010691 A1 * | 1/2011 | Lu et al. | 717/124 |
| 2011/0035629 A1 * | 2/2011 | Noller et al. | 714/38.14 |
| 2011/0060776 A1 * | 3/2011 | Suitts et al. | 707/827 |
| 2011/0066786 A1 | 3/2011 | Colbert | |
| 2011/0119473 A1 * | 5/2011 | Hyvonen et al. | 713/1 |
| 2011/0265076 A1 * | 10/2011 | Thorat et al. | 717/172 |
| 2012/0054551 A1 * | 3/2012 | Gao et al. | 714/38.1 |
| 2012/0144236 A1 * | 6/2012 | Black et al. | 714/25 |
| 2012/0166875 A1 * | 6/2012 | Arscott et al. | 714/32 |
| 2012/0266023 A1 * | 10/2012 | Brown et al. | 714/32 |
| 2013/0013784 A1 * | 1/2013 | O'Connell, Jr. | 709/226 |

OTHER PUBLICATIONS

"Virtual Machine Servicing Tool (VMST) 3.0", Retrieved at <<http://technet.microsoft.com/en-us/library/cc501231.aspx>>, Dec. 8, 2008, pp. 4.
"Creating and Managing Highly Available Virtual Machines in VMM", Retrieved at <<http://technet.microsoft.com/en-us/library/cc967323.aspx>>, Jun. 24, 2010, pp. 9.

* cited by examiner

*Primary Examiner* — Marc Duncan
(74) *Attorney, Agent, or Firm* — Bryan Webster; Andrews Sanders; Mickey Minhas

(57) ABSTRACT

In one embodiment, a digital asset testing system 200 may test a digital asset 202 before posting at a digital distribution store. A communication interface 180 may receive a digital asset 202. A processor 120 may execute testing of the digital asset 202 on a testing virtual machine 212 of a virtual machine set. The processor 120 may execute testing of the digital asset 202 simultaneous with testing executed on each virtual machine 212 of the virtual machine set. The processor 120 may delay testing of the digital asset 202 on the testing virtual machine 212 if a testing virtual machine configuration 214 is stale.

20 Claims, 5 Drawing Sheets

*300*

400

OPTIMIZING SYSTEM USAGE WHEN RUNNING QUALITY TESTS IN A VIRTUAL MACHINE ENVIRONMENT

BACKGROUND

Independent vendors may provide digital assets for downloading by users of computing devices. A digital asset may be a software application, an image, a video file, an audio file, a set of scientific data, or other digital objects. The digital assets may be automatically provided to consumers via a digital distribution store. A digital distribution store is a digital location, such as a web site, that allows a user to download the digital assets for free or for purchase. Often the administrator for these websites may want to test the digital assets before placing them on the digital distribution store.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a digital asset testing system to test a digital asset before posting at a digital distribution store. A communication interface may receive a digital asset. A processor may execute testing of the digital asset on a testing virtual machine of a virtual machine set. The processor may execute testing of the digital asset simultaneous with testing executed on each virtual machine of the virtual machine set. The processor may delay testing of the digital asset on the testing virtual machine if a testing virtual machine configuration is stale.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
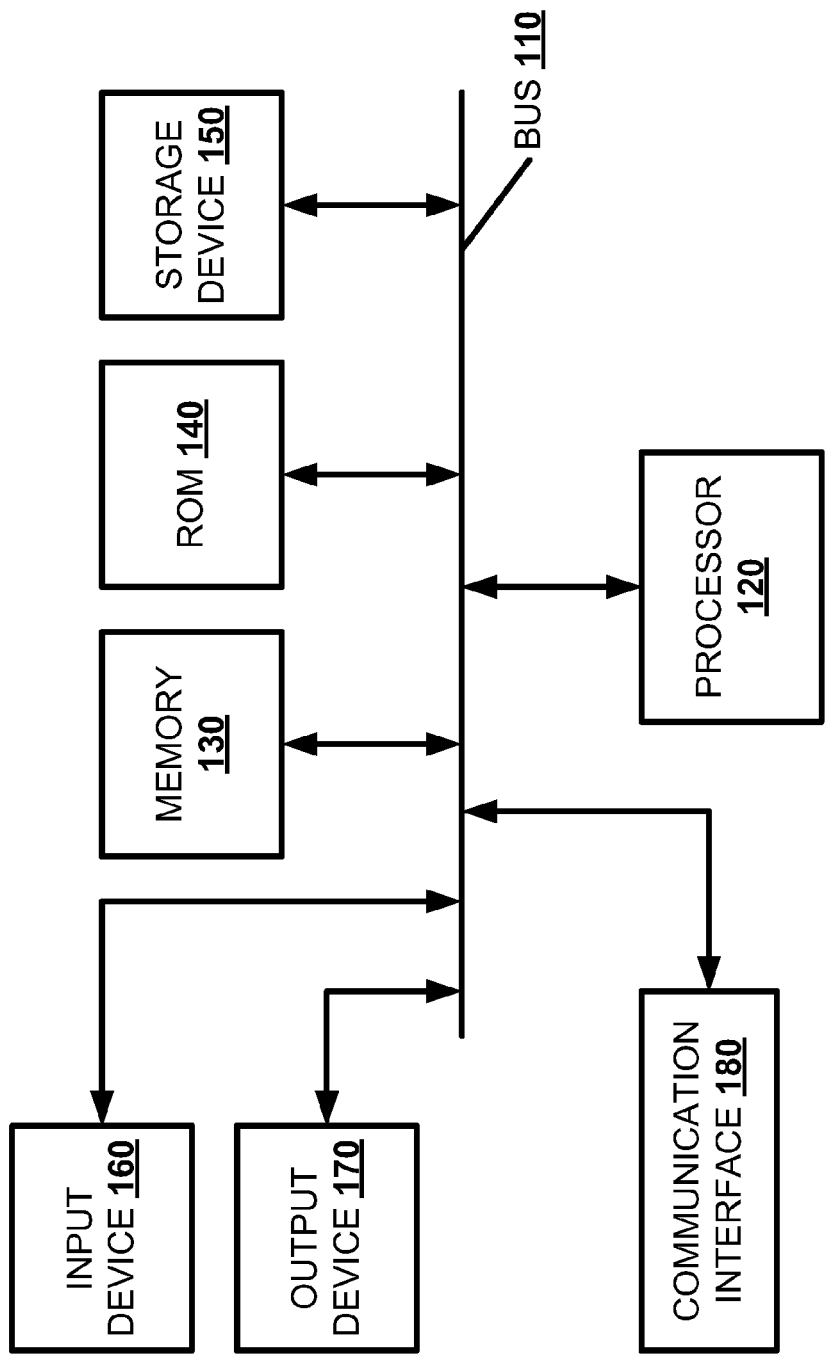
FIG. 1 illustrates, in a block diagram, one embodiment of a computing device.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a digital asset testing system for a computing device.

A digital asset testing system may use virtual machines to automate and isolate the testing of the digital assets prior to admission into the marketplace. The digital asset testing system may test the performance of a digital asset, such as an application. Alternately, the digital asset testing system may test a digital asset for corrupted data, viruses, or objectionable content. Some tests, such as performance tests, may be very sensitive to the system resource usage. For example, input and output operations to the disk during the execution of performance tests may cause the test results to be unreliable and unusable. During a system update, the virtual machines may update the virtual hard disk, causing multiple disk input/output operations. These input/output operations may distort the results of the automated certification tests underway.

The digital asset testing system may seek to coordinate testing and updates to minimize the impact on the testing results. The digital asset testing system may load a digital asset on a testing virtual machine operated by a virtual machine host. A digital asset is a software application or applet that is being tested. A testing virtual machine is a virtual machine that performs the test on the digital asset. The testing virtual machine may be part of a virtual machine set. A virtual machine host is a program that administers the virtual machine set.

The digital asset testing system may use multiple approaches to reduce input/output access while performing the testing of digital assets. The digital asset testing system may simultaneously execute tests on each virtual machine of the virtual machine set having a pending digital asset. Alternately, the digital asset testing system may wait until a digital asset has been loaded on each virtual machine of the virtual machine set, and then run a test on each virtual machine simultaneously. Thus the digital asset testing system may prevent one testing virtual machine from performing an input/output access while another testing virtual machine is performing a test.

Further, the testing virtual machine may delay testing a digital asset if the testing virtual machine configuration is "stale". The testing virtual machine configuration describes the software and virtual hardware of the testing virtual machine. A testing virtual machine configuration is "stale" when the testing virtual machine configuration is out of date. A testing virtual machine configuration is "fresh" when all updates to the testing virtual machine configuration have been received and installed. Thus, the testing virtual machine may avoid looking for updates while testing is being performed.

Thus, in one embodiment, a digital asset testing system may test a digital asset before posting at a digital distribution store. A communication interface may receive a digital asset. A processor may execute testing of the digital asset on a testing virtual machine of a virtual machine set. The processor may execute testing of the digital asset simultaneous with testing executed on each virtual machine of the virtual machine set. The processor may delay testing of the digital asset on the testing virtual machine if a testing virtual machine configuration is stale.

FIG. 1 illustrates a block diagram of an exemplary computing device 100 which may act as a digital asset testing system. The computing device 100 may combine one or more of hardware, software, firmware, and system-on-a-chip technology to implement the digital asset testing system. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method. The storage device 150 may also be a database or a database interface for storing testing virtual machine configurations.

The input device 160 may include one or more conventional mechanisms that permit a user to input information to the computing device 100, such as a keyboard, a mouse, a voice recognition device, a microphone, a headset, a touch-sensitive interface, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks. The communication interface 180 may include a network interface or a mobile transceiver interface. The communication interface 180 may be a wireless, wired, or optical interface.

The computing device 100 may perform such functions in response to a processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2:
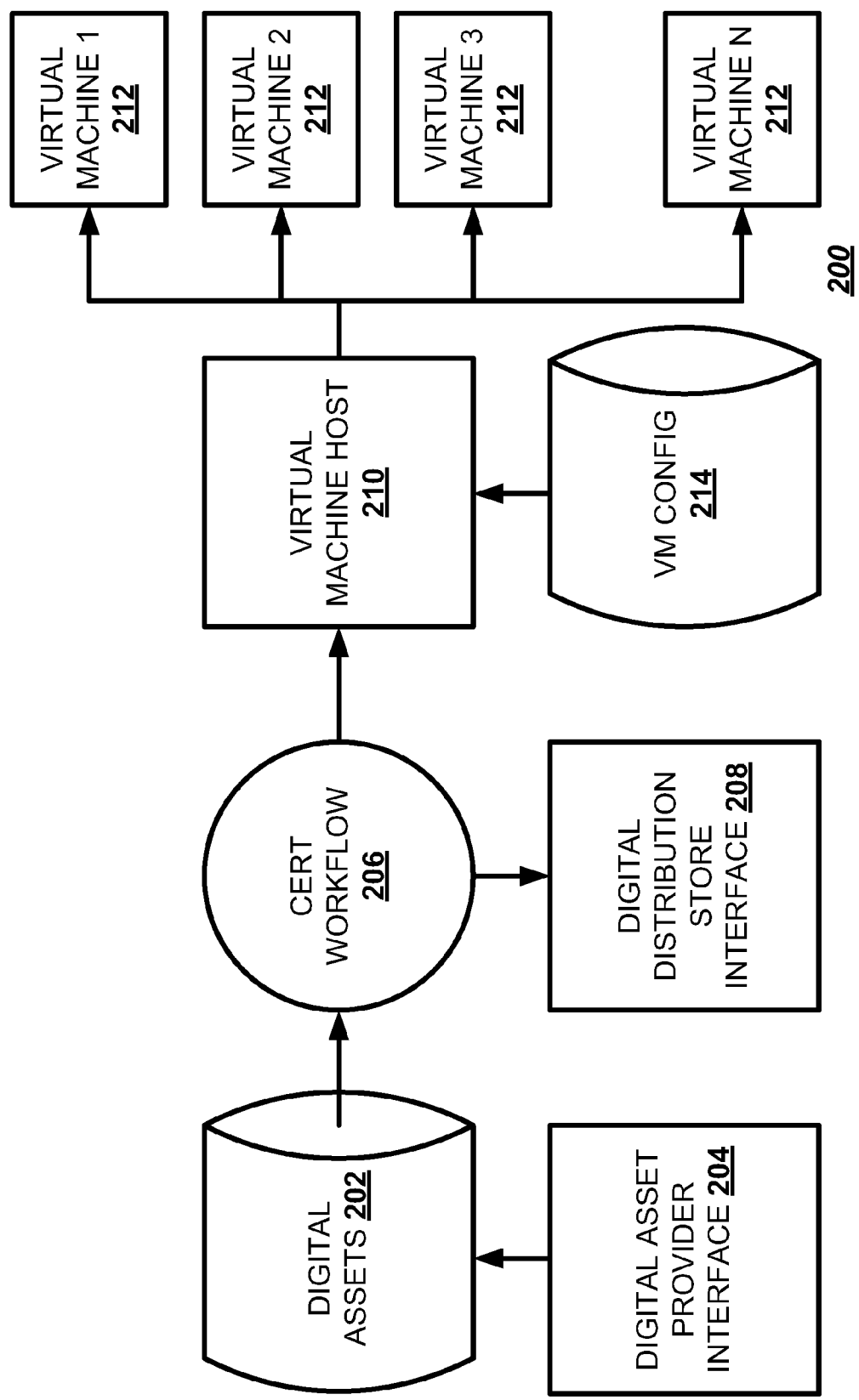
FIG. 2 illustrates, in a block diagram, one embodiment of a digital asset testing system.

FIG. 2 illustrates, in a block diagram, one embodiment of a digital asset testing system 200. A digital asset testing system 200 may receive a digital asset 202 from a digital asset provider via a digital asset provider interface 204. The digital asset testing system may place the digital asset 202 in a certification workflow (CERT WORKFLOW) 206 before posting the digital asset 202 to the digital distribution store via a digital distribution store interface 208. The certification workflow 206 may determine if the digital assets may perform properly when executed by a device meeting the specifications supported by the digital distribution store, or whether the digital assets may meet the standards and practices of the digital distribution store.

The certification workflow 206 may pass the digital asset 202 to one or more virtual machine hosts 210 to execute testing on the digital asset 202. The virtual machine host 210 may operate a virtual machine set having one or more testing virtual machines 212. Each testing virtual machine 212 may have a testing virtual machine configuration (VM CONFIG) 214 describing the hardware specifications and the operating system version of the testing virtual machine 212. The hardware specifications may be the data storage size, memory size, processor speed, and other hardware specifications. The testing virtual machine configuration may also describe the test code or test applications that may be used to execute the tests.

Each testing virtual machine 212 of the virtual machine set may test different digital assets 202. Each testing virtual machine 212 of the virtual machine set may have a different virtual machine configuration 214. Thus, the same virtual machine configuration 214 may be used to test different digital assets 202 and different virtual machine configurations 214 may be used to test the same digital assets 202.

Figure 3:
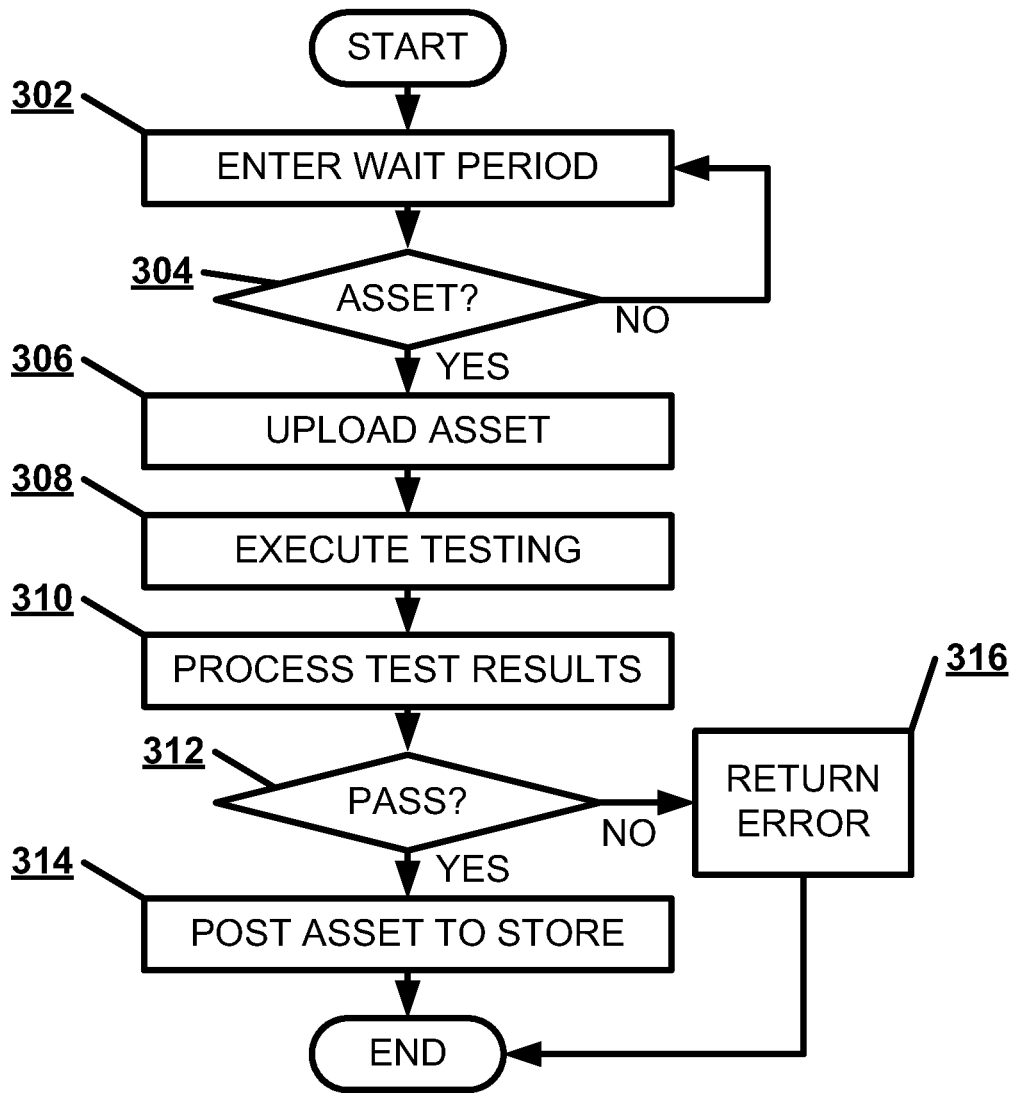
FIG. 3 illustrates, in a flowchart, one embodiment of a method for posting a digital asset to a digital distribution store.

FIG. 3 illustrates, in a flowchart, one embodiment of a method 300 for posting a digital asset 202 to a digital distribution store. The digital asset testing system 200 may enter a wait period to wait for a digital asset to be sent to the digital asset testing system 200 (Block 302). If a digital asset 202 is available (Block 304), the digital asset testing system 200 may upload the digital asset 202 from a digital asset provider (Block 306). The digital asset testing system 200 may execute testing on the digital asset 202 with a testing virtual machine 212 (Block 308). The digital asset testing system 200 may process the test results (Block 310). If the digital asset testing system 200 determines that the digital asset has passed testing (Block 312), the digital asset testing system 200 may post the digital asset 202 to a digital distribution store upon completion of testing (Block 314). If the digital asset testing system 200 determines that the digital asset fails testing (Block 312), the digital asset testing system 200 may return an error message to the digital asset provider (Block 316).

Figure 4:
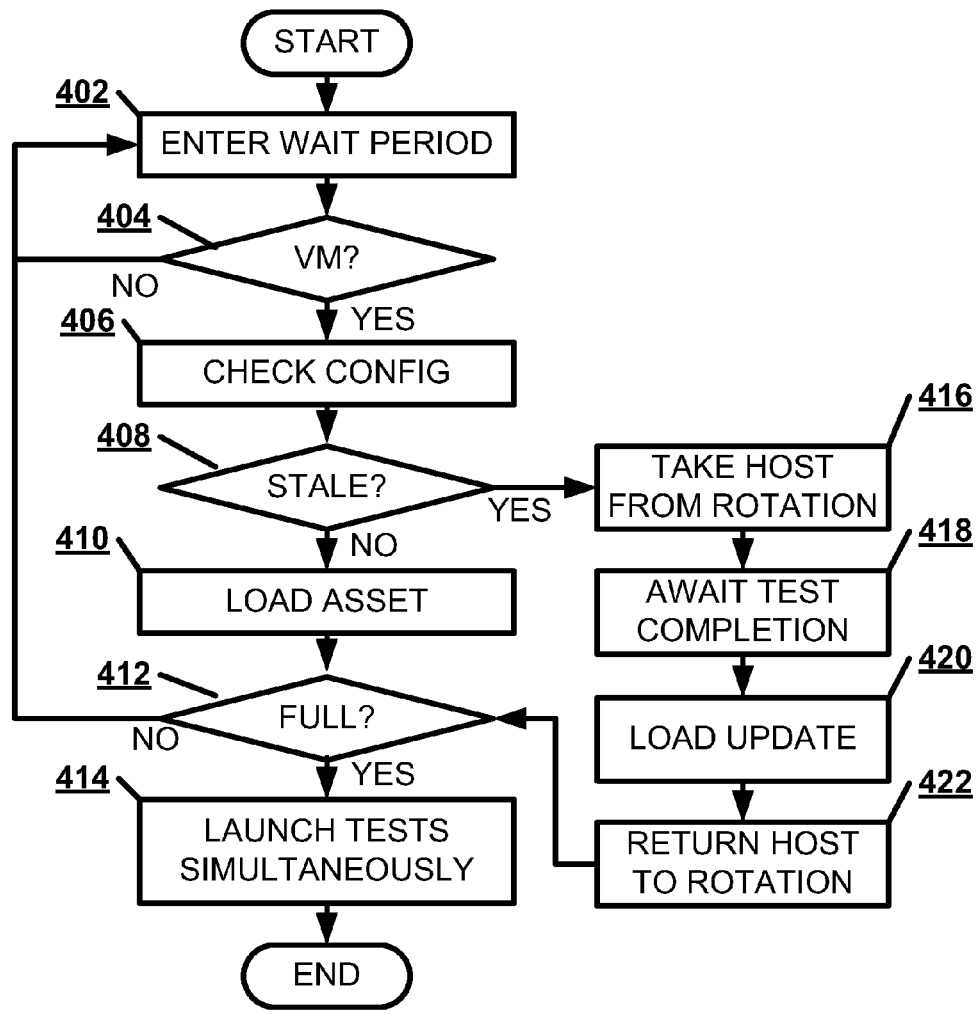
FIG. 4 illustrates, in a flowchart, one embodiment of a method for testing a digital asset.

FIG. 4 illustrates, in a flowchart, one embodiment of a method 400 for testing a digital asset 202. The digital asset testing system 200 may enter a wait period to wait for a testing virtual machine 212 to become available (Block 402). If a testing virtual machine (VM) 212 is available (Block 404), the digital asset testing system 200 may check a testing virtual machine configuration 214 of the testing virtual machine (Block 406). If the testing virtual machine configuration 214 is fresh (Block 408), the digital asset testing system 200 may load the digital asset 202 onto the testing virtual machine 212 (Block 410). If the virtual machine host 210 has a virtual machine set with a digital asset 202 loaded on each testing virtual machine 212 (Block 412), the digital asset testing system 200 may execute testing of the digital asset 202 on the testing virtual machine 212 simultaneous with executing testing on different digital assets 202 on each virtual machine of the virtual machine set (Block 414). Alternately, rather than wait for the virtual machine host to load each testing virtual machine in the virtual machine set, the digital asset testing system 200 may execute testing of a digital asset 202 on the testing virtual machine 212 simultaneous with any virtual machine 212 of the virtual machine set having a pending digital asset 202. Further, if the virtual machine host 210 operates different type of virtual machines 212, the same digital asset 202 may be tested on multiple virtual machines 212 of the virtual machine set.

If the testing virtual machine configuration 214 is stale (Block 408), the digital asset testing system 200 may delay testing of a digital asset on the testing virtual machine. The digital asset testing system 200 may take a virtual machine host 210 operating the testing virtual machine 212 out of a testing rotation (Block 416). The digital asset testing system 200 may wait for any testing being executed by the virtual machine set to be completed before updating (Block 418). The digital asset testing system 200 may load a virtual machine configuration update for each virtual machine of the virtual machine set (Block 420). The virtual machine configuration update may be a change to the virtual machine configuration or an entirely new virtual machine configuration. The digital asset testing system 200 may return the virtual machine host 210 to the testing rotation once the virtual machine configuration update is loaded (Block 422).

Figure 5:
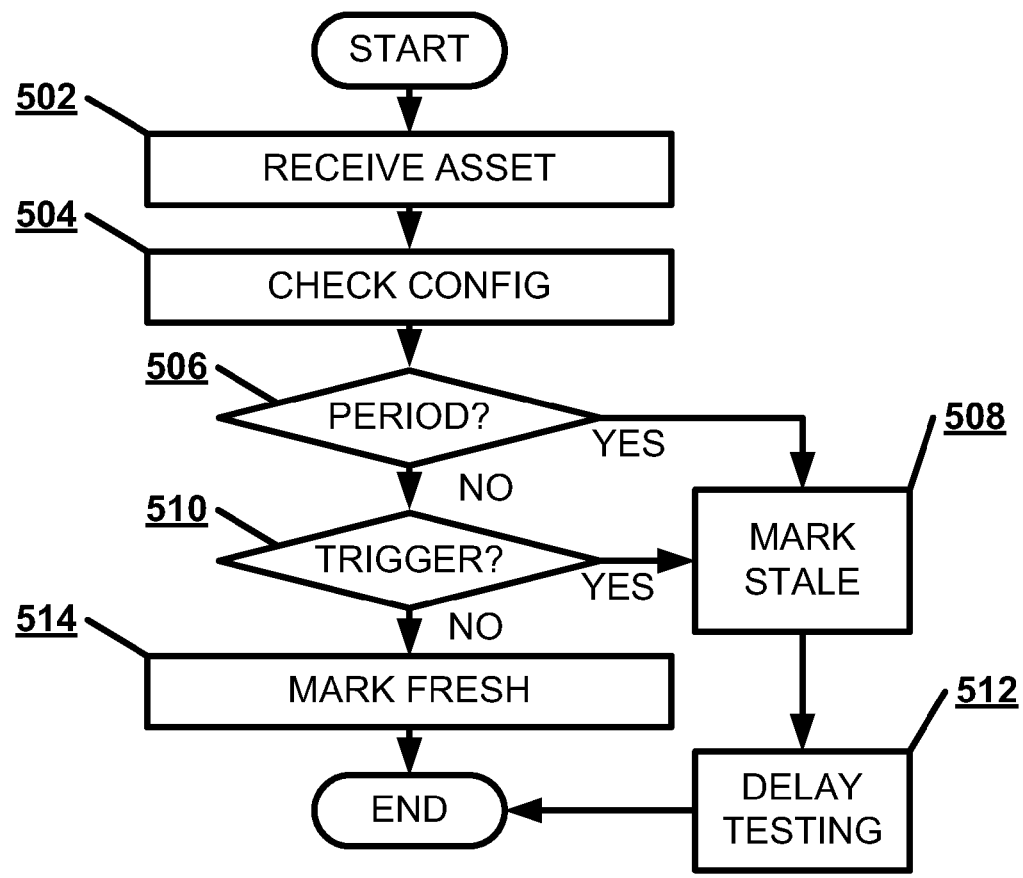
FIG. 5 illustrates, in a flowchart, one embodiment of a method of checking if a virtual machine is fresh or stale.

FIG. 5 illustrates, in a flowchart, one embodiment of a method 500 of checking if a testing virtual machine 212 is fresh or stale. The digital asset testing system 200 may receive the digital asset 202 (Block 502). The digital asset testing system 200 may check a testing virtual machine configuration 214 of a testing virtual machine 212 (Block 504). If a freshness period has passed (Block 506), the digital asset testing system 200 may determine that the testing virtual machine configuration 214 is stale (Block 508). The freshness period is a time period after a virtual machine configuration update is loaded that the updated virtual machine configuration is still valid. The freshness period may be determined by a system administrator. If an operational trigger has occurred (Block 510), the digital asset testing system 200 may determine that the testing virtual machine configuration 214 is stale (Block 508). An operational trigger is some event in normal operations that causes the testing virtual machine configuration 214 to update, such as a missing function or capability, outdated access credentials, or other operational events. If the testing virtual machine configuration 214 is stale, the digital asset testing system 200 delays testing of the digital asset 202 on testing virtual machine 212 (Block 512). Otherwise, the digital asset testing system may determine that the testing virtual machine configuration 214 is fresh (Block 514).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
checking a testing virtual machine configuration of a testing virtual machine;
delaying testing of a digital asset on the testing virtual machine if the testing virtual machine configuration is stale; and
taking a virtual machine host operating the testing virtual machine out of a testing rotation if the testing virtual machine configuration is stale.

2. The method of claim 1, further comprising:
loading a virtual machine configuration update.

3. The method of claim 1, further comprising:
determining that the testing virtual machine configuration is stale if a freshness period has passed.

4. The method of claim 1, further comprising:
determining that the testing virtual machine configuration is stale if an operational trigger has occurred.

5. The method of claim 1, further comprising:
processing test results.

6. The method of claim 1, further comprising:
uploading the digital asset from a digital asset provider.

7. The method of claim 1, further comprising:
returning an error message to a digital asset provider if the digital asset fails testing.

8. The method of claim 1, further comprising:
posting the digital asset to a digital distribution store upon completion of testing.

9. The method of claim 1, further comprising:
operating the testing virtual machine as part of a virtual machine set on a virtual machine host.

10. The method of claim 9, further comprising:
loading a virtual machine configuration update for each virtual machine of the virtual machine set.

11. The method of claim 10, further comprising:
waiting for any testing being executed by the virtual machine set to be completed before loading.

12. The method of claim 1, further comprising:
returning the virtual machine host to the testing rotation once a virtual machine configuration update is loaded.

13. A tangible machine-readable storage device having a set of instructions detailing a method stored thereon that when executed by one or more processors cause the one or more processors to perform the method, the method comprising:
operating a testing virtual machine of a virtual machine set on a virtual machine host;

executing testing of a digital asset on the testing virtual machine simultaneous with any virtual machine of the virtual machine set having a pending digital asset; and preventing a second virtual machine of the virtual machine set from performing an input/output access of a storage device during testing of the digital asset.

14. The tangible machine-readable storage device of claim 13, wherein the method further comprises:

executing testing of the digital asset on the testing virtual machine simultaneous with executing testing on different digital assets on each virtual machine of the virtual machine set.

15. The tangible machine-readable storage medium device of claim 13, wherein the method further comprises:

loading a virtual machine configuration update for each virtual machine of the virtual machine set.

16. The tangible machine-readable storage device of claim 15, wherein the method further comprises:

waiting for any testing being executed by the virtual machine set to be completed before loading.

17. A digital asset testing system, comprising:

a communication interface that receives a digital asset from a digital asset provider; and a processor that executes testing of the digital asset on a testing virtual machine of a virtual machine set simultaneous with testing executed on each virtual machine of the virtual machine set and takes a virtual machine host operating the testing virtual machine out of a testing rotation if a virtual machine configuration of the testing virtual machine is stale.

18. The digital asset testing system of claim 17, wherein each testing virtual machine of the virtual machine set is testing different digital assets.

19. The digital asset testing system of claim 17, wherein each testing virtual machine of the virtual machine set has a different virtual machine configuration.

20. The digital asset testing system of claim 17, wherein the processor returns the virtual machine host to the testing rotation once a virtual machine configuration update is loaded.

* * * * *